April 12, 1932.  H. W. BODENDIECK  1,853,600
EQUIPMENT FOR HANDLING AERIAL WIRES
Filed Jan. 5, 1928  4 Sheets-Sheet 4
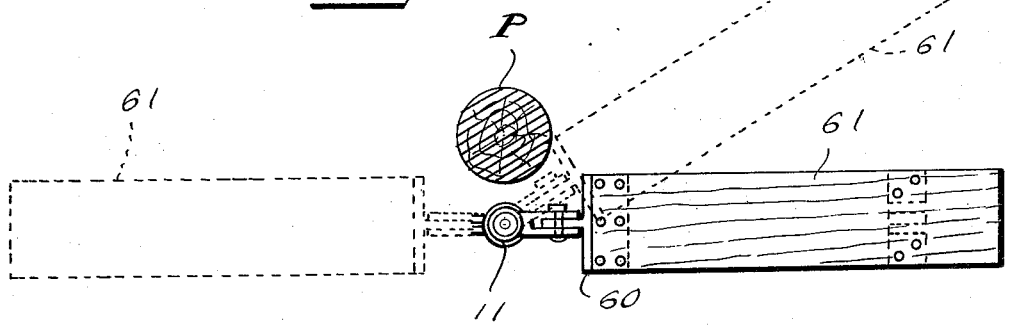
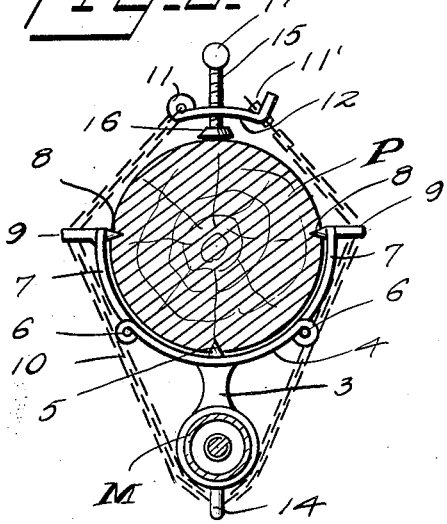
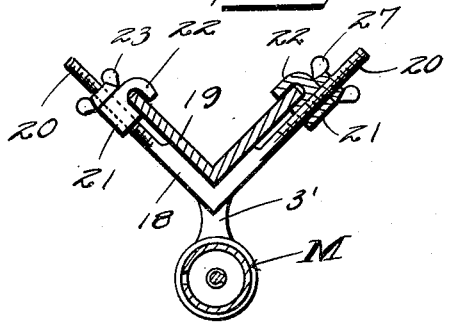
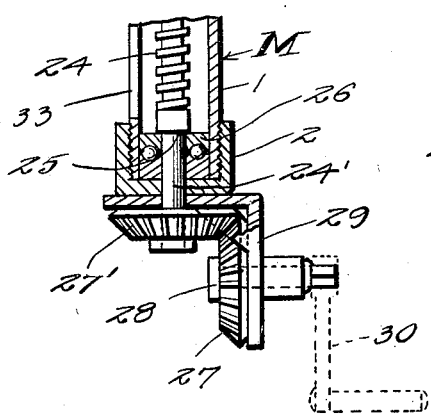
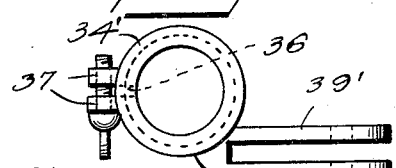
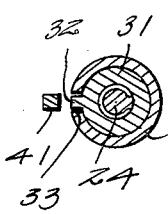
Inventor
H. W. Bodendieck
By Watson E. Coleman
Attorney Patented Apr. 12, 1932

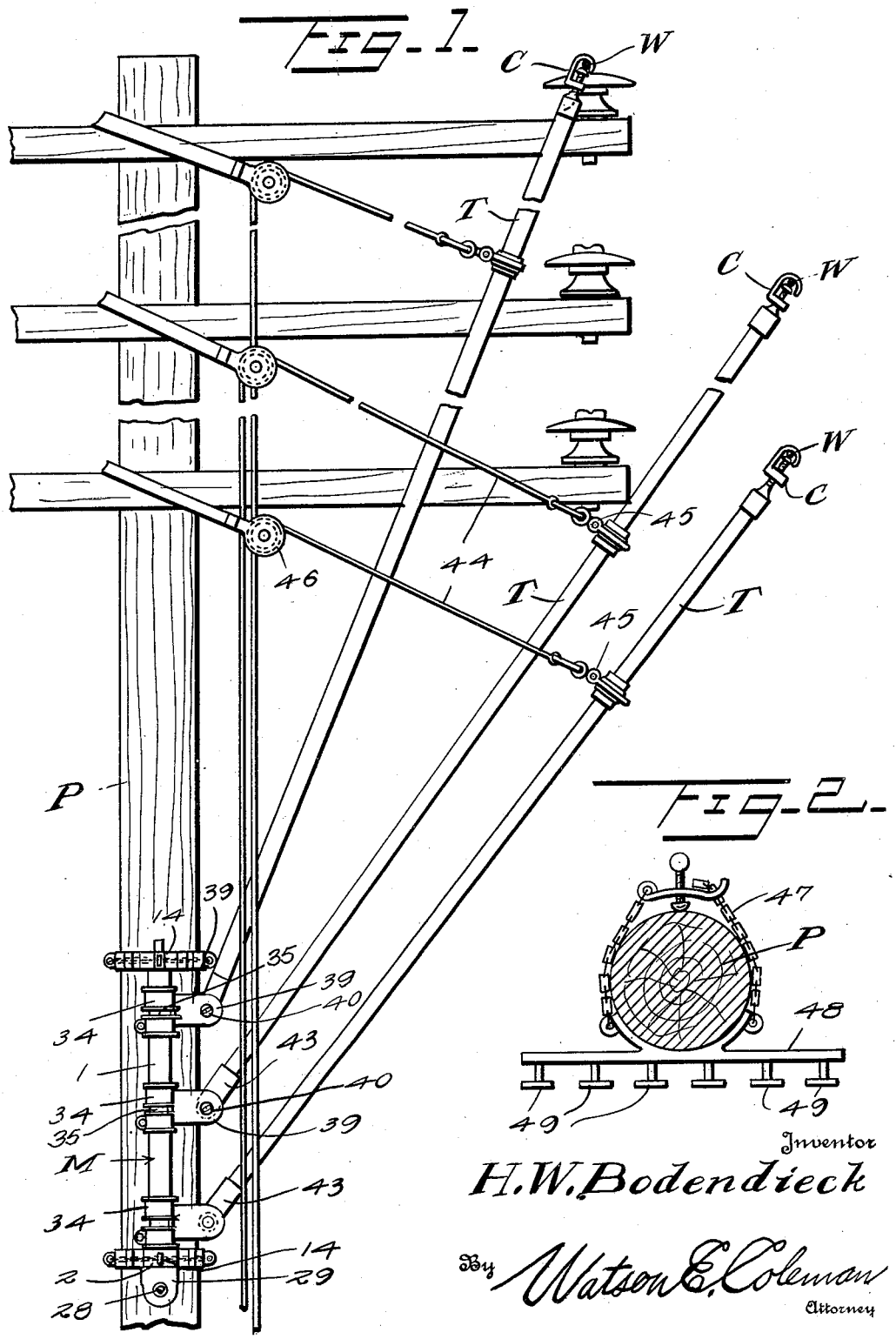

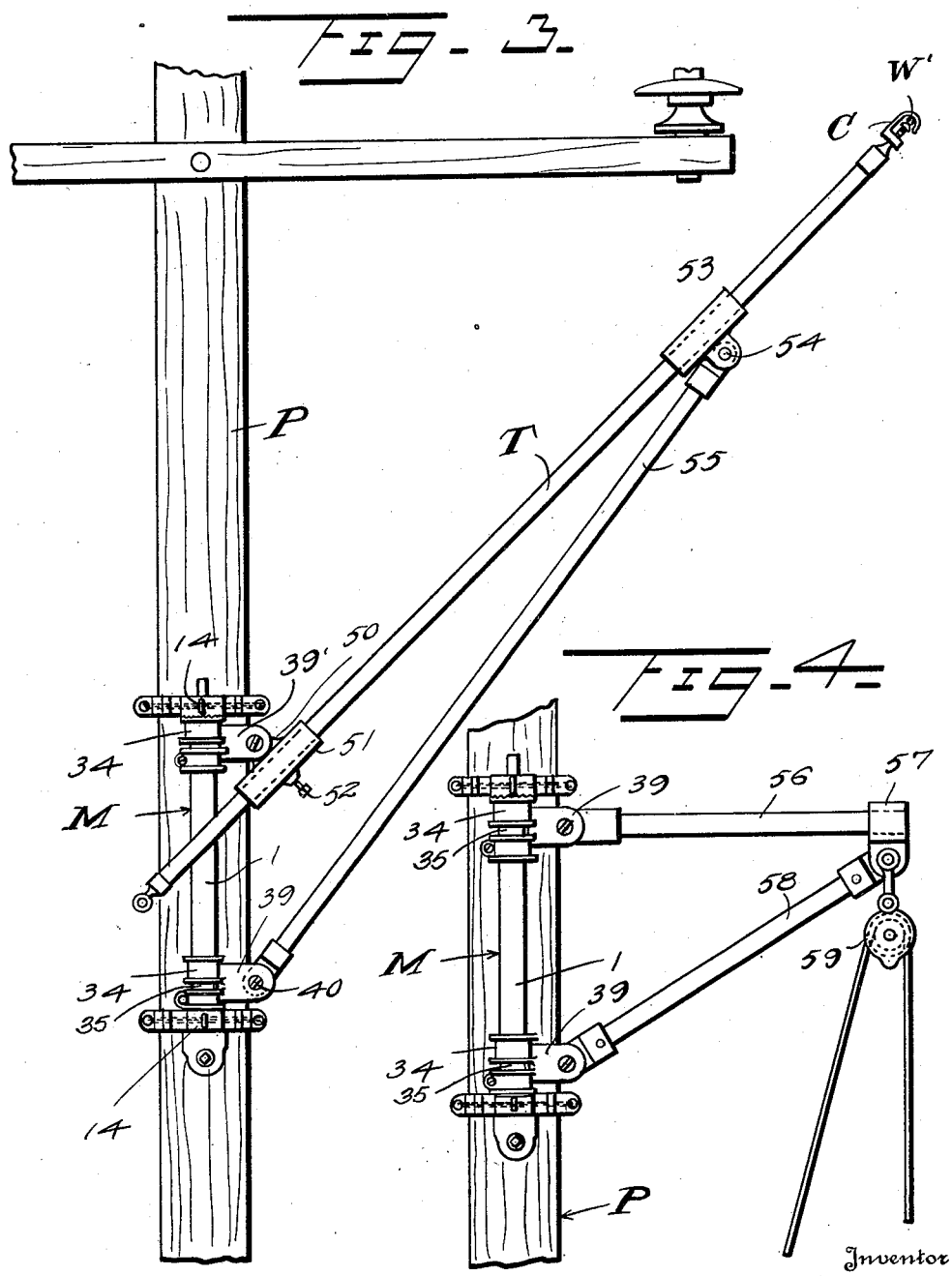

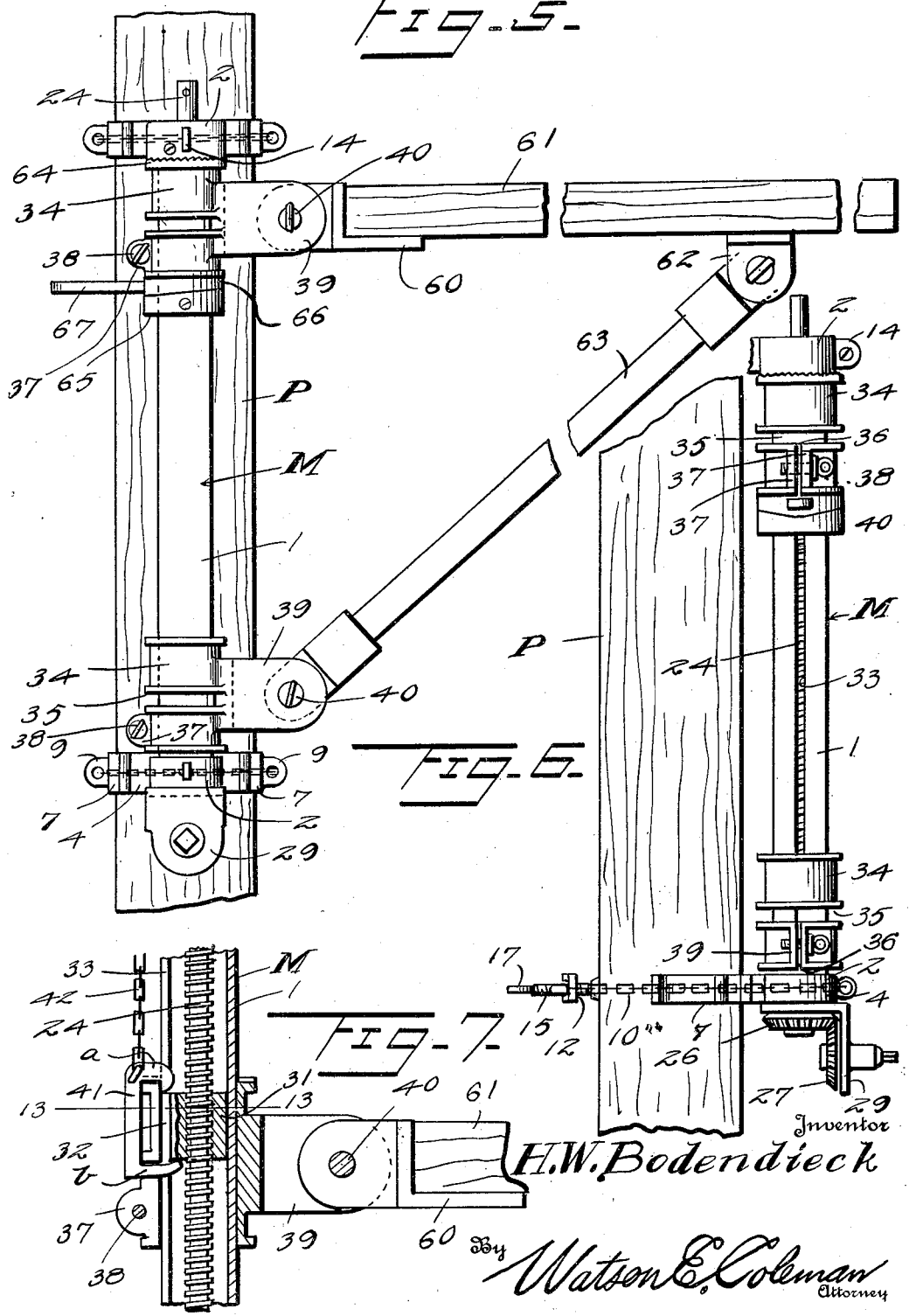

1,853,600

UNITED STATES PATENT OFFICE

HENRY W. BODENDIECK, OF TAYLORVILLE, ILLINOIS

EQUIPMENT FOR HANDLING AERIAL WIRES

Application filed January 5, 1928. Serial No. 244,759.

This invention relates to equipment for handling aerial wires and it is an object of the invention to provide an equipment of this kind especially adapted for use in connection with hot lines although it is to be understood that it can be used with equal facility in connection with a cold line.

The invention also has for an object to provide an equipment of this kind which embodies a portable supporting member which may be readily and conveniently applied to a tower leg, wood pole or the like and which provides an effective medium for the manipulation of a wire tong, for the mounting of a scaffold, or for use in connection with a boom or crane as the character of work incident to line maintenance may necessitate.

Furthermore, it is an object of the invention to provide an equipment of this kind embodying a supporting member including a plurality of attaching devices capable of adjustment along the supporting member and also of rotary or swinging adjustment, together with means whereby the desired adjustments of the attaching devices can be readily effected one independently of the remainder.

An additional object of the invention is to provide an equipment of this kind which enables a lineman to readily and conveniently handle a hot line irrespective of its location or position with respect to a tower or pole and wherein the equipment is particularly advantageous as it permits a ready adjustment of a wire tong engaged with a hot line by a lineman occupying a position at the upper portion of the tower or pole or a position in close proximity to the lines.

The invention consists in the details of construction and in the combination and arrangement of the several parts of my improved equipment for handling aerial wires whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is an elevational view illustrating an equipment constructed in accordance with an embodiment of my invention and in use in connection with high voltage lines;

Figure 2 is a detailed view partly in section and partly in top plan illustrating a cleat member applied to a pole for use in connection with the block and tackle pull ropes;

Figure 3 is an elevational view illustrating an equipment arranged in accordance with another embodiment of my invention and particularly for use in connection with light lines;

Figure 4 is an elevational view illustrating an assembly permitting the equipment to be used as a crane or boom;

Figure 5 is an elevational view illustrating the equipment in assembly for use to support a platform to facilitate working along a cross arm or its equivalent;

Figure 6 is a view in end elevation of the equipment as illustrated in Figure 5;

Figure 7 is an enlarged detailed view partly in section and partly in elevation illustrating the means as comprised in my equipment as herein disclosed to effect a selective adjustment of a connecting member;

Figure 8 is a fragmentary detailed sectional view illustrating the operating mechanism for the threaded shaft as comprised in the supporting member;

Figure 9 is a view partly in section and partly in elevation illustrating the means for securing the supporting member to a pole or the like;

Figure 10 is a detailed sectional view illustrating the means for connecting the supporting member to a tower leg or the like;

Figure 11 is a diagrammatic view in top plan illustrating the assembly embodying the platform and indicating by broken lines the various positions the platform may assume;

Figure 12 is a view in top plan illustrating a slightly modified form of connecting member;

Figure 13 is a detailed sectional view taken substantially on the line 13—13 of Figure 7.

The equipment as herein embodied is capable of various different assemblies essential to the maintenance of aerial lines either of high or low voltage but in connection with all of the assemblies I employ a common supporting member M. This supporting member is readily portable and is adapted to be secured or anchored at any required point upon a pole, a tower leg or other kindred element.

The supporting member M, as herein disclosed, comprises an elongated tubular member 1 having its opposite end portions threaded or otherwise engaged within a cap 2. The cap 2 is carried by the outer portion of a bracket arm 3 as illustrated in Figure 9, or 3' as illustrated in Figure 10.

In Figure 9, the arm 3 is integrally formed with an arcuate member or plate 4 adapted to have close contact with the periphery of a pole P and at its central portion the plate 4 is provided with an inwardly disposed prong 5 adapted to penetrate the pole and thus serving to maintain the same in a fixed position thereon. The opposite end portions of the plate 4 have hingedly connected thereto, as at 6, the arcuate wing plates 7 also adapted to be brought into close contact with the periphery of the pole P, the outer end portions of said plates 7 being also provided with the inwardly directed prongs 8 which are adapted to penetrate the pole P to further facilitate effective engagement with the pole.

The outer extremities of the plates 7 are also provided with the outstanding perforated ears 9 through which are freely directed the opposite end portions of a chain 10, the extremities of which is anchored, as at 11 and 11', to the extremities of a plate 12, said plate 12 being disposed adjacent to the portion of the pole P diametrically opposed to the arm 3. The central portion of the chain 10 is freely directed through an eye-member 14 extending outwardly from the cap member 2. The connection 11' is of any preferred type whereby the chain 10 may be detachably and adjustably engaged with the adjacent end portion of the plate 12. This connection is preferably accomplished by providing the plate 12 with a conventional bifurcation or claw which readily receives a chain link in a manner which is believed to be well known.

Threaded through the central portion of the plate 12 is a threaded shank 15 having a swivel foot 16 adapted for contact with the pole P, while the opposite or outer end of the shank 15 is provided with a wing 17 or other means whereby requisite rotation may be imparted to the shank. After the chain 10 has been initially applied and adjusted around the pole P further adjustment or pull is imposed thereon by requisite rotation of the shank 15, resulting in the adjacent end portion of the supporting member M being effectively secured or anchored to the pole.

As this means of attachment is associated with the opposite end portions of the member M, it will be readily understood that said member is fixedly held in desired position along the pole yet in a manner whereby it may be readily removed when required.

In the embodiment of my invention as illustrated in Figure 10, the arm 3' is integrally formed with and extends out from the apex portion of a angle member 18 which is adapted to have close contact with an angle iron 19 comprised in a tower leg or other kindred structure. The extremities of the member 18 are formed to provide threaded shanks 20 which are freely disposed through the sleeves 21. The sleeves 21 are provided with the inwardly facing hook members 22 for engagement over the marginal portions of the iron 19 and are effectively held in locking engagement therewith through the instrumentality of the wing nuts 23 or the like threaded upon the shanks 23 outwardly of but having close contact with the sleeves 21.

Disposed axially through the tubular member 1 is a shaft 24 having its end portions rotatably disposed through the cap members 2. The lower portion 24' of the shaft 24 is reduced resulting in a shoulder 25 which has contact from above with a thrust bearing 26 arranged in the lower portion of the tubular member 1 whereby the desired rotation of the shaft 24 is materially facilitated. The extended extremity of the portion 24' has fixed thereto a gear 27' meshing a gear 27 carried by a stub shaft 28. The shaft 28 is rotatably supported by an angular bracket 29 which is also freely engaged with the portion 24' of the shaft 24 between the gear 26 and the adjacent cap 2. The shaft 28 is adapted to be driven by a crank as indicated by dotted lines at 30 or otherwise as may be preferred.

The major portion of the shaft 24 within the tubular member 1 is threaded and engaged with said threaded portion is a block 31 which moves lengthwise of the member 1 upon rotation of the shaft 24 and in a direction depending upon the direction of rotation of the shaft. This block 31 snugly engages within the member 1 and is provided with an outstanding rib or spline 32 which engages within a slot 33 provided in a wall of the member 1 and extending lengthwise thereof. By this means the block 31 is held against rotation within the tubular member 1.

Slidably mounted upon the tubular member 1 is a plurality of connecting members 34 each comprising a sleeve provided at its central portion with a circumferentially disposed slot 35 extending substantially entirely therearound. The portion of the sleeve to one side of the slot 35 is split, as at 36, with the free extremities of such split portion being defined by the outstanding and substantially parallel ears 37 with which is operatively engaged a screw member 38. Upon proper rotation of the screw member 38 the split portion of the sleeve 34 will be brought into clamping engagement with the member 1 and thus effectively hold the member or sleeve 34 against movement lengthwise of the member 1 or against turning movement therearound. The central portion of the member 34 has extending outwardly and laterally therefrom a pair of spaced arms 39 having operatively engaged with the outer portion thereof a pin 40 adapted to bridge the space between said arms 39.

When it is desired to adjust a member or sleeve 34 lengthwise of the tubular member 1, the shaft 24 is rotated in a direction to bring the block 31 to a position above or to the side of the slot 35 opposite from the split portion of the sleeve or member whereupon a substantially U-shaped locking member or key 41 straddles the upper or solid portion of the member or sleeve 34 with one leg a locked to an end portion of the member or sleeve 34 and the second leg b extending through the slot 33 and substantially in contact with the adjacent end of the block 31. The leg a also closely approaches the block 31 or more particularly the rib or spline 32. With the member or sleeve 34 locked to the block 31 said sleeve will be moved as desired along the tubular member 1 upon requisite rotation of the shaft 24. When the desired positioning of the sleeve or member 34 has been effected, the yoke or key 41 is removed after the split portion of the member or sleeve has been tightened or clamped upon the member 1 whereby a fixed location is maintained.

The leg b extends within the member 1 through the slot 36 of the member or sleeve 34 and with the split portion of the member or sleeve 34 loose, the member or sleeve 34 may be rotated or swung around the member 1 as desired, the extent of such swinging or rotary movement, of course, depending upon the extent of the slot 36.

The yoke or key 41 as herein disclosed has connected thereto a flexible member 42, such as a chain or the like, the opposite end portion of which is suitably anchored to the member or sleeve 34. This is done to prevent loss of this yoke or key when not in use.

The assembly as particularly illustrated in Figure 1 is preferably for the purpose of handling hot wires of high voltage and, as illustrated in Figure 1, two of the high tension wires are shown as swung out of the clear while the upper wire is shown as having engaged therewith a tong ready to be freed from an insulator and moved into the clear. The tubular member 1 of the supporting member M in this assembly is provided with three connecting members or sleeves 34 although it is to be understood that any number may be employed in accordance with the number of wires to be handled. For each of the wires W is employed a tong T of desired length and which is provided at one end portion with a casting 43 adapted to be disposed between the arms 39 of the member or sleeve 34 and held thereto by a pin 40. The opposite or outer end portion of the tong is provided with a clamp C adapted to be engaged with the wire. This clamp may be of a construction which is believed to best comply with the requirements of practice and of a type which may be readily hooked over the wire and then secured thereto upon turning movement of the tong proper.

The member M is applied by the lineman to the desired location on the pole P or its equivalent and a connecting member or sleeve 34 is selectively adjusted in a manner which has hereinbefore been described. A tong T is then operatively engaged through the instrumentality of a clamp C with the desired wire W whereupon the inner end portion of the tong is operatively engaged with the member or sleeve 34 through the instrumentality of the casting 43 and the arms 39. At this time one of the lineman imparts desired rotation to the shaft 24 through the instrumentality of the crank 30 or its equivalent resulting in an upward movement of the tong T with a consequent lifting of the wire W from its associated insulator. The tong T is then permitted to swing outwardly and downwardly a desired distance until said released wire has been moved sufficiently in the clear. Before the lifting movement of the tong T, a cable or kindred flexible member 44 is secured to the tong T at a desired point therealong, as indicated at 45, said cable or flexible member being operatively engaged with a pulley 46 operatively supported by the pole P or the like at a point above the applied member M. The cable or flexible member 44 is of a length to extend downwardly to a point in close proximity to the ground surface so that a groundman may readily control the downward movement of the tong to swing a wire W into the clear, or to impose the requisite upward pull on the tong when it is desired to return the wire W to its insulator. The lower portion of the pole P, as particularly illustrated in Figure 2, has clamped thereto, as generally indicated at 47, a cross arm 48 carrying a plurality of outstanding cleats 49 with which a cable 44 is adapted to be affixed. By the use of a series of cleats 49 the various cables 44 are maintained entirely separated so that during a working operation the liability of confusion is substantially eliminated on the part of the groundman upon receiving instructions from the lineman on the pole as to the desired adjustment of the tong T.

With this assembly as illustrated in Figure 1, attention is particularly directed to the fact that the required adjustment of the tong T to lift a wire W from an insulator or to return the same into engagement therewith may be accomplished by a lineman on the pole, thus avoiding hinderance and delay which would otherwise be probable of occurrence should it be necessary for the lineman to give the required instructions for such operations to a groundman.

The assembly as illustrated in Figure 3 is of a character particularly intended for lines of low voltage and in such assembly the use of cables and pulleys or kindred tackle is eliminated. In this assembly only two members or sleeves 34 are employed, the same being adjusted in desired relative position in a manner hereinbefore explained. Engaged between the arms 39 of the upper member or sleeve 34 is a web or flange 50 extending laterally from a sleeve 51 through which a tong T′ is freely insertible, said tong being effectively held against endwise movement through said sleeve 51 by a holding screw 52 or the like. The outer portion of the tong T′ is also freely disposed through a second sleeve 53 which has pivotally connected therewith, as at 54, an end portion of a bracing tong 55. The opposite end portion of the bracing tong 55 is engaged between the arms 39 of the lower member or sleeve 34. A lineman on the pole P by the release of the holding screw 52 may readily operate the tong T′ to free the wire from its insulator and swing the wire into the clear, or with equal facility to return the wire W′ from the clear back into requisite position with respect to the insulator. Preferably, when the wire W′ is in the clear it is effectively held in such position by tightening the holding screw 52.

It is also to be understood that with the tong T′ locked to the sleeve 51, requisite endwise movement may be imposed on the tong T′ upon travel of the upper sleeve or member 34 along the tubular member 1.

It is to be understood that if preferred the sleeve 51 may be operatively engaged with the lower member or sleeve 34 and the bracing tong with the upper member or sleeve 34 to the same advantage. This, however, is a matter of preference.

In the assembly illustrated in Figure 4 is shown an arrangement which can be readily used as a boom or crane to facilitate the raising to a lineman on the pole, or particularly upon the cross arm or a platform, of such articles as may be required for the maintenance of the line. In this assembly the members or sleeves 34 are properly spaced and to the arms 39 of the upper member or sleeve 34 is operatively engaged an end portion of a horizontally disposed bar 56 of requisite length. To the outer end portion of this bar 56 is suitably affixed a casting 57. Connected to this casting 57 is an end portion of a brace bar 58, the opposite end portion of which is operatively engaged with the arms 39 of the lower member or sleeve 34. Suitable block and tackle 59 are operatively engaged with the casting 57 and serve to provide effective means for raising from the ground an article desired by a lineman on the pole. In this assembly the uppermost member or sleeve 34 is locked to the shaft 24 through the medium of the yoke or key 41 while the lower member or sleeve 34 is in direct contact with the lower cap 2. The split portions of both of these members or sleeves 34 are loosened so that, if desired, the outstanding bar 56 together with the load imposed thereon by the block and tackle 59 may be swung around to any position preferred or required in order to effect the desired delivery of such an article to the lineman or in close proximity to the particular location where the work is to be done.

If after the article raised by the block and tackle 59 is desired to be swung in close to the pole, the upper member or sleeve 34 is freed from the block 31 and the split portion thereof tightened to hold the same fixed. The split portion of the lower member or sleeve 34 is loosened and said lower member or sleeve 34 is locked to the block 31 by the yoke or key 41. The lineman then effects requisite rotation of the shaft 24 to move the lower member or sleeve 34 upwardly, resulting in an upward and inward swinging movement of the bar 56, thus bringing the block and tackle 59 and the load carried thereby closer to the pole P in accordance with the extent of upward swinging movement of the bar 56.

The assembly as illustrated in Figures 5 and 6 is for use in connection with a platform or trestle to facilitate a lineman working at different points on a cross arm or the like or otherwise at points outwardly from the pole or tower. In this assembly, the members or sleeves 34 are properly spaced and to the arms 39 of the uppermost member or sleeve 34 is engaged a bracket 60 which is carried by an end portion of a platform or trestle board 61 of requisite dimensions. Depending from the opposite or outer end portion of the board 61 is a second bracket 62 which is adapted to be operatively engaged with the outer end portion of the bracing tong 63. This tong 63 has its inner or lower end portion operatively engaged with the arms 39 of the lower member or sleeve 34. The upper face of the top member or sleeve 34 is serrated or toothed for engagement with a similarly serrated or toothed portion of the adjacent cap 2, as indicated at 64 in Figure 5. In order to assure proper meshing of said serrated or toothed portions I fix to the tubular member 1 below the upper member or sleeve 34 a cam collar 65. Freely mounted on the member 1 between this cam collar 65 and the upper member or sleeve 34 is a second cam collar 66 provided with an outstanding operating handle 67. By requisite pull upon the handle 67 the collar 66 will rotate in a direction to effect the upward movement of the top member or sleeve 34 to bring the serrated or toothed portions 64 into locking or meshed engagement. This locking engagement between the upper member or sleeve 34 and cap 2 serves to effectively hold said member or sleeve 34 against turning or swinging movement and thereby assure the maintenance of the platform or trestle in desired placement. Furthermore, this locking connection reduces the torsional strain on the tubular member 1 proper as the major portion of such strain is received upon the cap 2 and direct to the pole P or the like through its connection therewith.

In employing this assembly the board 61 may be vertically adjusted to bring the same to proper level by imposing the required movement to the lower member or sleeve 34, said lower member or sleeve 34 when properly adjusted being held in such desired position by proper tightening of the split portion thereof.

It is also to be understood that in this assembly upon releasing the toothed or serrated meshing portions 64, which may be accomplished by the proper rotation of the cam collar 66 and by loosening the split portions of both of the members or sleeves 34, the platform or trestle may be swung from one side to the other with respect to the pole P or at desired points intermediate such extremes as is diagrammatically indicated by broken lines in Figure 11.

In Figure 12, I illustrate a form of sleeve or member 34' wherein the arms 39' are slightly offset to one side of the radial center of the member or sleeve 34'. This arrangement is particularly employed in the assembly in Figure 1 in order to assure unhindered passage of one applied tong passing the other. This form of member or sleeve 34' is also employed in the assembly as illustrated in Figure 3 and particularly at the top in order to assure proper clearance of the inner or lower end portion of the tong T' passing the member 1.

From the foregoing description it is thought to be obvious that an equipment for handling aerial wires constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A wire handling equipment comprising an elongated member, means carried thereby for anchoring the same to a support, a second member mounted upon the elongated member for sliding movement thereon, means for locking said second member upon the elongated member against sliding movement along said elongated member, and means carried by the elongated member for imparting movement to the second member along the elongated member when the locking means is in release, said second member being provided with attaching means.

2. A wire handling equipment comprising an elongated member, means carried thereby for anchoring the same to a support, a second member mounted upon the elongated member for sliding movement thereon, means carried by the elongated member for imparting movement to the second member along the elongated member, said means being normally free from the second member, said second member being provided with attaching means for attachment to the elongated member, and releasable means for locking said second member to the second means to effect the desired movement of the second member along the elongated member.

3. A wire handling equipment comprising an elongated member, means carried thereby for anchoring the same to a support, a second member mounted upon the elongated member for sliding movement thereon, means carried by the elongated member for imparting movement to the second member along the elongated member, said means being normally free from the second member, releasable means for locking said second member to the second means to effect the desired movement of the second member along the elongated member, and means for clamping the second member to the elongated member to hold said second named member against movement.

4. A wire handling equipment comprising an elongated member, means carried thereby for anchoring the same to a support, a second member mounted upon the elongated member for sliding movement thereon, means carried by the elongated member for imparting movement to the second member along the elongated member, said second member being provided with attaching means, said second member being also capable of turning movement upon the elongated member.

5. An equipment of the class described comprising an elongated member, means carried thereby for anchoring the same to a support, a plurality of members mounted upon the elongated member for movement lengthwise thereof, an operating means for the movable members carried by the elongated member normally free from the movable members, and releasable means for selectively connecting one of the second named members with said operating means for moving said selective second member along the elongated member.

6. An equipment of the class described comprising an elongated member, means for anchoring the same in working position, a plurality of members mounted upon the elongated member and capable of independent movement thereof, means carried by the elongated member and selectively engageable with one of the members for moving the same independently of the remainder of said members, and locking means carried by each of the second named members coacting with the elongated member.

7. An equipment of the class described comprising an elongated member, anchoring means therefor, a shaft rotatably carried by the member, end thrust bearings for the shaft carried by the elongated member for holding the shaft against endwise movement independently of the elongated member, a block threaded upon the shaft and moving lengthwise thereof upon rotation of the shaft, means for rotating the shaft, a second member mounted upon the elongated member for movement thereon, and means for connecting said second member to the block to cause said second member to move in unison with the block.

8. An equipment of the class described comprising an elongated member, anchoring means therefor, a shaft rotatably carried by the member, end thrust bearings for the shaft carried by the elongated member for holding the shaft against endwise movement independently of the elongated member, a block threaded upon the shaft and moving lengthwise thereof upon rotation of the shaft, means for rotating the shaft, a second member mounted upon the elongated member for movement thereon, means for connecting said second member to the block to cause said second member to move in unison with the block, and means carried by said second member for locking the same against movement on the elongated member, said second member being provided with attaching means.

9. An apparatus of the class described comprising an elongated member, anchoring means therefor, a second member mounted upon the elongated member for movement thereon, said second member being provided with attaching means, means for imparting movement to the second member and cooperating with the attaching means, said second member having a split portion surrounding the elongated member, and means for clamping said split portion to the elongated member for holding the second member against movement.

10. A wire handling equipment comprising an elongated member, means carried thereby for anchoring the same to a support, a second member mounted upon the elongated member for sliding movement thereon, means carried by the elongated member for imparting movement to the second member along the elongated member, said second member being provided with attaching means, said second member being also capable of turning movement upon the elongated member, and means for locking the second member against movement with respect to the elongated member.

In testimony whereof I hereunto affix my signature.

HENRY W. BODENDIECK.